(12) United States Patent
Tomiyama et al.

(10) Patent No.: US 11,534,951 B2
(45) Date of Patent: Dec. 27, 2022

(54) APPARATUS, METHOD AND COMPUTER PROGRAM PRODUCT FOR SCREW CONFIGURATION INFERENCE

(71) Applicant: THE JAPAN STEEL WORKS, LTD., Tokyo (JP)

(72) Inventors: Hideki Tomiyama, Hiroshima (JP); Yohei Fukuzawa, Hiroshima (JP); Takahide Takeuchi, Hiroshima (JP)

(73) Assignee: THE JAPAN STEEL WORKS, LTD., Shinagawa-ku (JP)

( * ) Notice: Subject to any disclaimer, the term of this patent is extended or adjusted under 35 U.S.C. 154(b) by 360 days.

(21) Appl. No.: 16/620,910

(22) PCT Filed: Jun. 13, 2017

(86) PCT No.: PCT/JP2017/021871
§ 371 (c)(1),
(2) Date: Jun. 15, 2020

(87) PCT Pub. No.: WO2018/229881
PCT Pub. Date: Dec. 20, 2018

(65) Prior Publication Data
US 2022/0080646 A1    Mar. 17, 2022

(51) Int. Cl.
*B29C 48/92*     (2019.01)
*B29C 48/40*     (2019.01)
(Continued)

(52) U.S. Cl.
CPC .............. *B29C 48/92* (2019.02); *B29C 48/40* (2019.02); *B29C 45/76* (2013.01); *B29C 48/08* (2019.02);
(Continued)

(58) Field of Classification Search
None
See application file for complete search history.

(56) References Cited

U.S. PATENT DOCUMENTS

| 4,040,607 A | 8/1977 | Ullrich |
| 10,549,453 B2 * | 2/2020 | Tomiyama .......... B29C 48/2513 |
| 2017/0090430 A1 | 3/2017 | Nakazawa |

FOREIGN PATENT DOCUMENTS

| CN | 106557069 | 4/2017 |
| JP | 51-60253 | 5/1976 |

(Continued)

OTHER PUBLICATIONS

International Search Report and Written Opinion for International Application Serial No. PCT/JP2017/021871 dated Aug. 8, 2017, 8 pages.

(Continued)

*Primary Examiner* — Robert J Grun
(74) *Attorney, Agent, or Firm* — Amin, Turocy & Watson, LLP

(57) ABSTRACT

The apparatus of the invention includes: an acquisition unit 101 that acquires input information including resin properties and acquires, as output information, a specified value of a physical quantity related to a kneaded resin or a kneading machine; a storage unit 16 that stores a knowledge file 162 containing correlations among the input information, the physical quantity and a plurality of screw configurations; and a search unit 106 and a configuration generator unit 107 together that infers, on the basis of the input information and the knowledge file 162, such a screw configuration that is able to meet the specified value.

8 Claims, 16 Drawing Sheets

(51) Int. Cl.
 *B29C 48/08* (2019.01)
 *B29C 45/76* (2006.01)
(52) U.S. Cl.
 CPC .............. *B29C 2948/92514* (2019.02); *B29C 2948/92704* (2019.02); *B29C 2948/92885* (2019.02); *B29C 2948/92895* (2019.02)

(56) References Cited

FOREIGN PATENT DOCUMENTS

| | | |
|---|---|---|
| JP | 2002-214107 | 7/2002 |
| JP | 2005-97225 | 1/2005 |
| JP | 2016-159390 | 9/2016 |

OTHER PUBLICATIONS

Chinese Office Action for Chinese Patent Application No. 201780092023.1 dated Mar. 30, 2021.

* cited by examiner

161a:
- Process Type Number
- Extruder Size Number
- Extrusion Amount
- Screw Rotation Speed
- Screw Configuration Numbers
  - 1
  - 2
  - :
  - n
- Cylinder Configuration Numbers
  - 1
  - 2
  - :
  - n

161b:
- Actual Measured Extruded Resin Temperature
- Actual Measured Specific Power (Esp.)
- Actual Measured Solid Phase Occupation Ratio
- Actual Measured Residence Time
- Actual Measured Maximum Pressure in Kneading Zone
- Actual Measured Maximum Torque

161c:
- Analytically Calculated Extruded Resin Temperature
- Analytically Calculated Specific Power (Esp.)
- Analytically Calculated Solid Phase Occupation Ratio
- Analytically Calculated Residence Time
- Analytically Calculated Maximum Pressure in Kneading Zone
- Analytically Calculated Maximum Torque

161d:
- Error Amount of Extruded Resin Temperature
- Error Amount of Specific Power
- ⋮

| Element Type | Symbol | Actual Geometry | Disc Shift Angle | Element Length (L/D) |
|---|---|---|---|---|
| Forward Twisted Kneading Disc | | | 45° | 0.5 |
| | | | | 1.0 |
| | | | | 1.5 |
| Backward Twisted Kneading Disc | | | −45° | 0.5 |
| | | | | 1.0 |
| | | | | 1.5 |
| Orthogonal Kneading Disc | | | 90° | 0.5 |
| | | | | 1.0 |
| | | | | 1.5 |

FIG.14
| No. | Screw Configuration in Kneading Zone (Schematic) |
|---|---|
| Screw A | 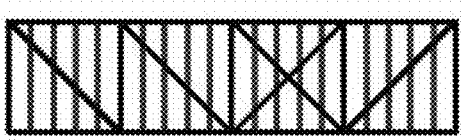 |
| Screw B | 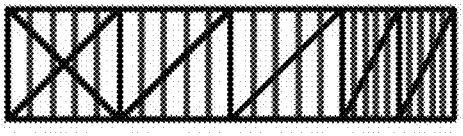 |
| Screw C |  |
| Screw D |  |

| No. | 100rpm | | | | 200rpm | | | | 300rpm | | | |
|---|---|---|---|---|---|---|---|---|---|---|---|---|
| | Actual Measurement | | Analytical Calculation | | Actual Measurement | | Analytical Calculation | | Actual Measurement | | Analytical Calculation | |
| | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin |
| Screw A | 204.0 | None | 204 | None | 206.0 | None | 211 | None | 210.3 | None | 210 | None |
| Screw B | 204.0 | None | 205 | None | 213.0 | None | 214 | None | 218.7 | None | 224 | None |
| Screw C | 200.0 | None | 200 | None | 197.3 | None | 202 | None | 189.0 | None | 207 | None |
| Screw D | 205.3 | None | 202 | None | 209.3 | None | 211 | None | 212.0 | None | 220 | None |

(b)

| No. | 200rpm | | | | 300rpm | | | | 400rpm | | | |
|---|---|---|---|---|---|---|---|---|---|---|---|---|
| | Actual Measurement | | Analytical Calculation | | Actual Measurement | | Analytical Calculation | | Actual Measurement | | Analytical Calculation | |
| | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin |
| Screw A | 196.0 | Exist | 201 | Exist | 196.0 | Exist | 207 | Exist | 197.7 | Exist | 214 | None |
| Screw B | 197.7 | Exist | 205 | Exist | 198.3 | None | 214 | None | 204.7 | None | 223 | None |
| Screw C | 190.3 | Exist | 194 | Exist | 187.0 | Exist | 197 | Exist | 189.0 | Exist | 202 | Exist |
| Screw D | 197.0 | Exist | 200 | Exist | 196.7 | Exist | 207 | Exist | 204.7 | Exist | 213 | Exist |

FIG.16
| No. | Screw Configuration in Kneading Zone (Schematic) |
|---|---|
| Screw E | 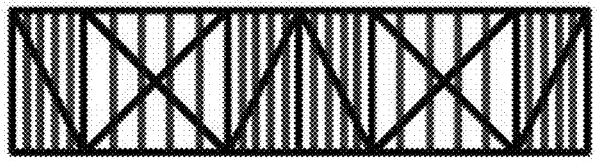 |
| Screw F | 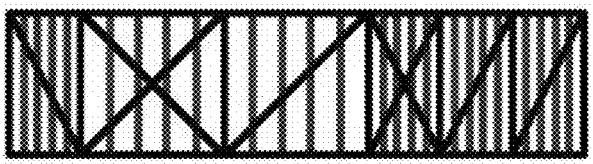 |
| Screw G | 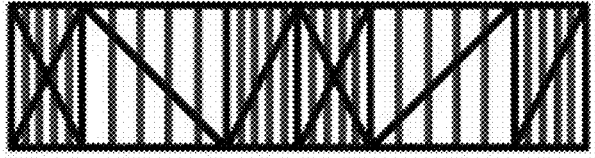 |
| Screw H | 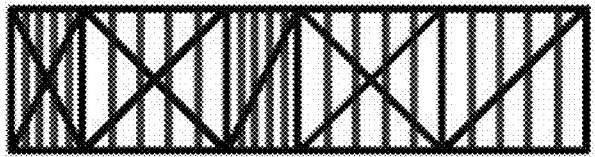 |

FIG.17

| No. | 250rpm | | | | 300rpm | | | | 350rpm | | | | 400rpm | | | |
|---|---|---|---|---|---|---|---|---|---|---|---|---|---|---|---|---|
| | Actual Measurement | | Analytical Calculation | | Actual Measurement | | Analytical Calculation | | Actual Measurement | | Analytical Calculation | | Actual Measurement | | Analytical Calculation | |
| | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin | Extruded Resin Temperature[°C] | Non-melted Resin |
| Screw E | 200.7 | None | 206 | None | 201.0 | None | 210 | None | 202.0 | None | 213 | None | 203.3 | None | 217 | None |
| Screw F | 199.7 | None | 208 | None | 200.0 | None | 212 | None | 202.3 | None | 216 | None | 203.7 | None | 220 | None |
| Screw G | 198.0 | None | 207 | None | 199.7 | None | 211 | None | 203.3 | None | 215 | None | 204.7 | None | 219 | None |
| Screw H | 197.7 | None | 207 | None | 198.7 | None | 211 | None | 202.7 | None | 215 | None | 204.3 | None | 220 | None |

APPARATUS, METHOD AND COMPUTER PROGRAM PRODUCT FOR SCREW CONFIGURATION INFERENCE

FIELD

An embodiment of the present invention relates to an apparatus for inferring extrusion process conditions of a kneading machine for kneading resin or other materials by means of a screw, which may be used typically as an injection molding machine or as an extrusion molding machine.

BACKGROUND

Extrusion molding machines (or extruders, hereinafter) are used for continuous production of resin pellets, plastic film, plastic sheet, and various other plastic products. In a resin extrusion process, it is critically important to ensure that the quality level of the extruded resin is equal to or higher than the desired level. Here, the "quality of resin" involves many requirements including: achieving well-mixed condition of the raw materials of the resin; non-existence of abnormal substances (such as degraded substances) in the resin which could be produced by over-kneading; non-existence of non-melted raw materials or agglomerates of any of raw materials in the extruded resin, which could be produced by under-kneading; non-existence of heat-degraded substances in the resin, which could be produced by excessive temperature rise: and others. All of these requirements have to be satisfied in order to manufacture selling plastic products. There are, however, many cases where the raw materials to be used for manufacturing a resin product are prescribed and cannot be changed, and in addition, any property modification cannot be effected to the raw materials. In such a case, it is critically important to optimize the screw configuration of the extruder and/or the operation conditions of the extruder, in order to satisfy the requirements.

As a related prior art technique, there is known a method of inferring operation conditions of an injection molding machine. The injection molding machine is provided with a plunger for injecting melted resin into the mold so as to mold a plastic product. Under a certain set of operation conditions for injecting melted plastic into the mold for molding a plastic product, the injection molding machine is operated to inject melted plastic into a measurement apparatus, and a flow length of the melted plastic within the measurement apparatus is measured at each of a plurality of extrusion positions of the plunger. Then, prior to the injection of melted plastic into the mold by an other injection molding machine to mold a plastic product, a set of operation conditions for that other injection molding machine are inferred such that: when that other injection molding machine is operated to inject melted plastic into the measurement apparatus, the same flow length of the melted plastic within the measurement apparatus can be achieved at each of a plurality of corresponding extrusion positions of that other injection molding machine (see Patent Document No. 1 listed below).

PRIOR ART DOCUMENT(S)

Patent Document(s)

Patent Document No. 1: Japanese Patent Application Publication No. 2005-22225

SUMMARY OF THE INVENTION

Problems to be Solved by the Invention

For a screw extruder, the screw is a key part, and the configuration of the screw, or the "screw configuration" mentioned above, is so critical. The time consumed for inference of the screw configuration is a dominant factor which dominates the length of time for development of a new extrusion process. In order for an optimization of the screw configuration, however, both knowledge and know-how to be gathered through a lot of experience. Under the circumstances, there has been a problem that it is not easy for a relatively less experienced engineer to devise an excellent screw configuration.

The present invention is achieved in order to solve the above mentioned problem. Accordingly, it is an object of the present invention to provide a screw configuration inference apparatus, a screw configuration inference method and a computer program for screw configuration inference, for inferring a screw configuration of a kneading machine.

Resolution

In order to achieve the above object, an aspect of the present invention provides an apparatus comprising: an information acquisition unit that acquires input information including resin properties and acquires, as output information, a specified value of a physical quantity related to a kneaded resin or a kneading machine; a storage unit that stores knowledge information including correlations among the input information, the physical quantity and a plurality of screw configurations; and a configuration inference unit that infers, on the basis of the input information and the knowledge information, such a screw configuration that is able to meet the specified value.

Advantages Provided by the Invention

According to the present invention, a screw configuration of a kneading machine may be advantageously inferred. The other advantages provided by the invention will become apparent from the description of exemplary mode for carrying out the present invention shown below.

BRIEF DESCRIPTION OF THE DRAWINGS

FIG. 4 is a schematic diagram showing a data structure of the learning file according to the embodiment.

FIG. 14 is a table showing screw configurations (kneading part screw configurations), which were used for the numerical analysis.

FIG. 15 is two tables, each showing both the experiment results and the analysis results, in which table (a) shows the results with the extrusion amount of 10 kg/hour, while table (b) shows the results with the extrusion amount of 30 kg/hour.

FIG. 16 is a table showing optimum screw configurations which are able to meet the specified conditions, and which have been inferred through the inference procedure.

FIG. 17 is a table showing the experiment and analysis results for the optimum screw configurations.

DETAILED DESCRIPTION

Figure 1:
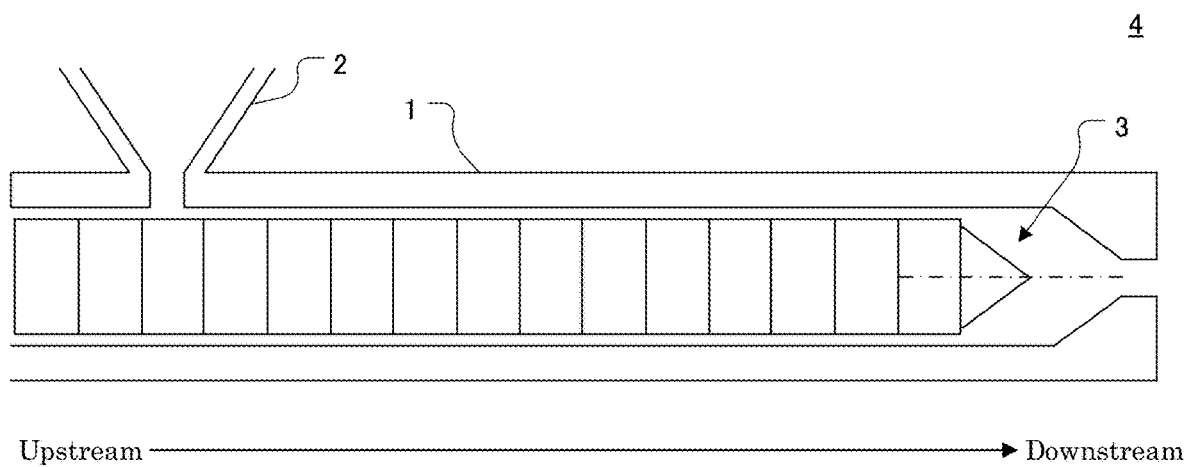
FIG. 1 is a schematic cross-sectional view of a twin screw extruder, to which a screw configuration inference is applied according to an embodiment.

With reference now to the accompanying drawings, an embodiment of the present invention is described in detail. In the specification and drawings, elements having substantially the same functions are designated by the same reference numerals and redundant description is avoided for simplicity.

In general, a screw configuration inference apparatus according to an embodiment of the present invention includes an artificial intelligence algorithm and a numerical analysis software, in which the artificial intelligence algorithm performs learning procedures on the basis of numerical analysis results and experiment results, so as to infer optimum screw configurations and optimum extrusion process conditions, which are optimized for specified requirements. FIG. 1 shows an exemplified extruder, to which screw configuration inference may be applied. More specifically, FIG. 1 is a schematic cross-sectional view of a twin screw extruder, to which a screw configuration inference is applied according to the embodiment described herein. The extruder 4 shown in FIG. 1 includes: a cylinder (barrel) 1, within which raw materials of resin are get melted; a hopper inlet 2, which is provided on the cylinder 1 at the position near the upstream end of the cylinder 1, and through which raw materials of resin are introduced into the cylinder 1; and two screws 3 (only one of them is shown in FIG. 1) supported for rotation within the cylinder 1, for melt-mixing/kneading raw materials of resin and transferring the mixture toward the front end (or the downstream end) of the cylinder 1. In the following description, it is described how the screw configuration inference apparatus according to the embodiment is used in order to infer an optimum screw configuration for the screws 3 of the extruder 4. Note that the screw configuration inference apparatus may be used not only to infer an optimum configuration of the screws 3 used in twin screw extruders, but also to infer an optimum configuration of any types of screws, such as screws used in single screw extruders, single flight screws, double flight screws, and others.

[Instrument Structure]

Figure 2:
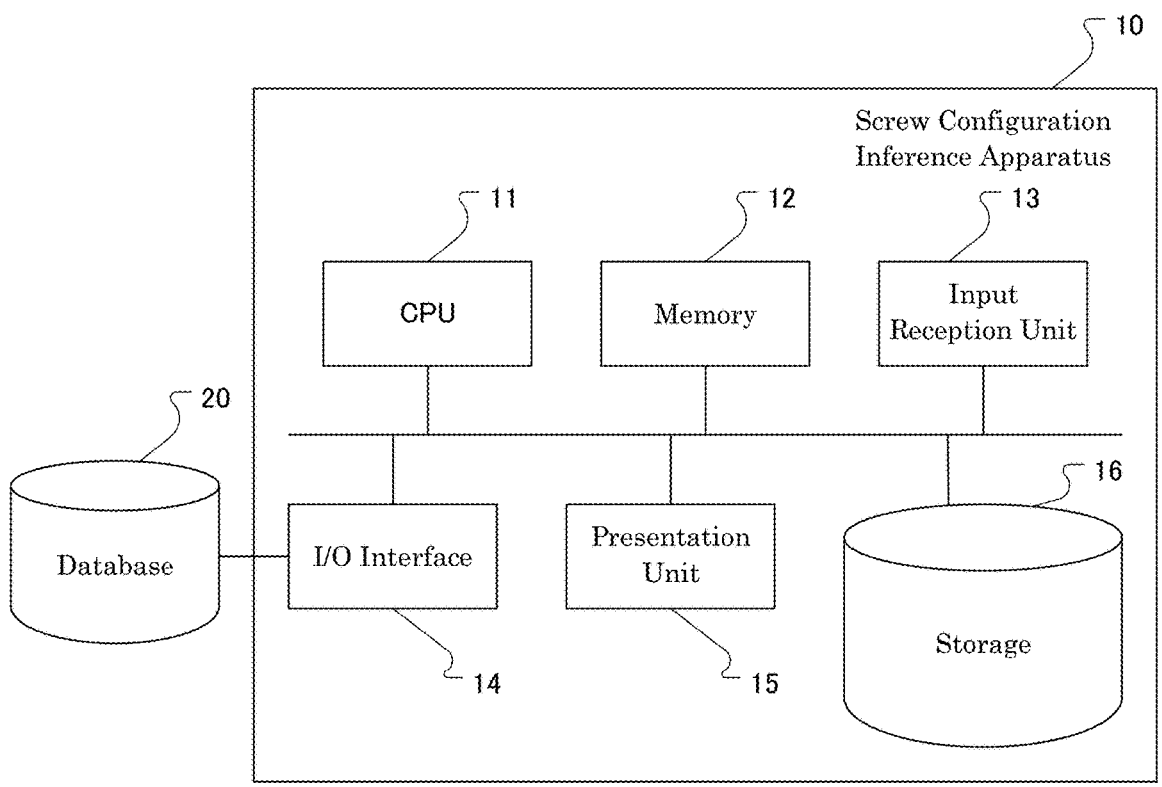
FIG. 2 is a block diagram showing a hardware structure of a screw configuration inference apparatus according to the embodiment.

With reference now to FIG. 2, an instrument structure of the screw configuration inference apparatus according to an embodiment is described. FIG. 2 is a block diagram showing a hardware structure of a screw configuration inference apparatus according to the embodiment. As shown in FIG. 2, the screw configuration inference apparatus 10 includes a central processing unit (CPU) 11, a memory 12, an input reception unit 13, an input/output interface (I/O interface) 14, a presentation unit 15 and a storage 16.

The CPU 11 runs various executing programs loaded on the memory 12, including: an operating system (OS), a basic input/output system (BIOS), generic application programs, and others. The CPU 11 controls the screw configuration inference apparatus 10 by running these programs.

The memory 12 includes a random access memory (RAM) providing a volatile storage area, which is used as a work area for the running programs.

The input reception unit 13 receives inputs from the operator of the screw configuration inference apparatus 10. The input reception unit 13 may include a computer mouse (a pointing device capable of designating specific points on the display screen), and a keyboard (an input device having an arrangement of keys to which letters, signs, or specific functions are allocated).

The I/O interface 14 is used for transferring input/output signals and data between the screw configuration inference apparatus 10 and various peripheral devices. In particular, with the embodiment shown herein, the screw configuration inference apparatus 10 uses the I/O interface 14 in order to acquire actual measurement data 202 stored in a database 20 held by one of the peripheral devices. The actual measurement data 202 include the results of experiments carried out with various devices, and the results of each experiment are individually organized in the database 20. The actual measurement data 202 will be described later in more detail.

The presentation unit 15 is an output device and include a display device for displaying (i) a graphical user interface (GUI), which may be implemented by the OS and/or an application program running on the OS, and (ii) various visual information including results of analysis and others. The display device also displays 2-dimensional visual images showing (i) values of items inputted by the operator, including a value indicating the process type, (ii) drawings of screw configurations inferred through a screw configuration inference procedure described later in detail, and others.

The storage 16 is a non-volatile includes, such as a hard disk drive (HDD), providing a storage area for storing various data including: values of parameters used in the screw configuration inference procedure; values of physical quantities calculated out through the screw configuration inference procedure, values of items contained in learning files 161 or in a knowledge file 162, which will be describe later in detail.

[Functional Structure]

Figure 3:
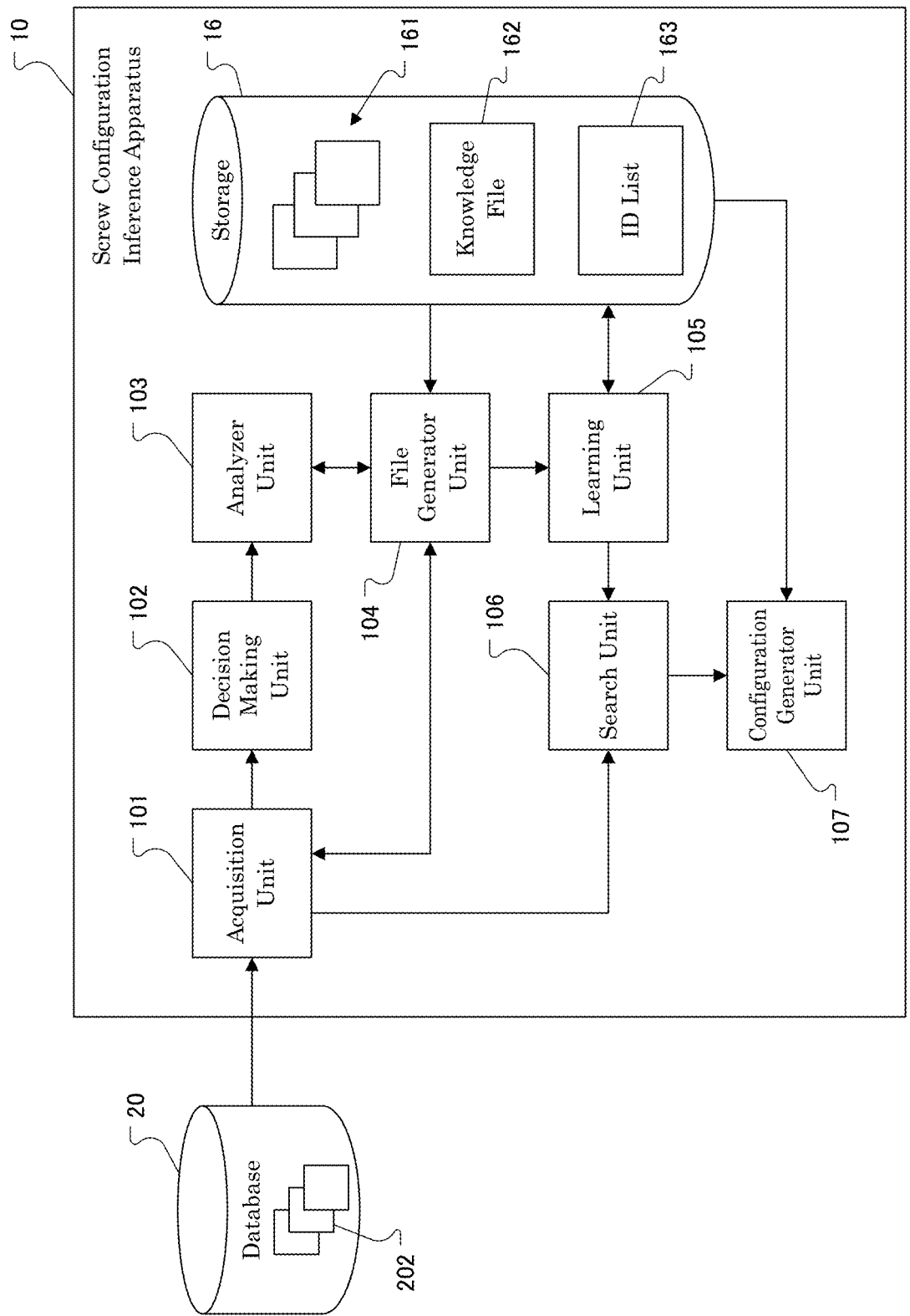
FIG. 3 is a functional block diagram showing a functional structure of the screw configuration inference apparatus according to the embodiment.

With reference now to FIG. 3, a functional structure of the screw configuration inference apparatus 10 is described in detail. FIG. 3 is a functional block diagram showing a functional structure of the screw configuration inference apparatus according to the embodiment. As shown in FIG. 3, the screw configuration inference apparatus 10 includes functional units including: an acquisition unit 101; a decision making unit 102; an analyzer unit 103; a file generator unit 104; a learning unit 105; a search unit 106; and a configuration generator unit 107. These functional units are implemented by means of the cooperation among the above mentioned hardware resources, such as the CPU 11 and the memory 12 among others. By means of these functional units, a screw configuration inference procedure is carried out, as described later in detail.

The acquisition unit 101 acquires data including values of various parameters from which values of certain specified physical quantities are analytically calculated out through a numerical analysis, values of analysis results, values of experiment results, and others. Some of these data may be acquired as input data which are manually inputted by the operator, and the other may be acquired from the database 20 held in a peripheral device. With the embodiment described herein, the parameters include a process type, operation conditions, and configuration data. These parameters will be described later in more detail.

The decision making unit 102 makes various decisions which have to be made in the screw configuration inference procedure, as described later in detail. The decisions include: a decision as to whether the database 20 has been updated a decision as to whether an analysis result learning process is to be carried out, a decision as to whether an actual measurement result learning process is to be carried out, and others.

The analyzer unit 103 carries out, on the basis of the acquired values of the parameters, a numerical analysis, in particular, computer aided engineering (CAE) analysis, through which the values of various physical quantities, including the excluded resin temperature among others, are calculated out as the analysis results. The method used for the numerical analysis carried out by the analyzer unit 103 may be any one of various known techniques, with which the values of the physical quantities may be calculated out. For example, it may be the Lattice Element Method, the Flow Analysis Network (FAN) Method, the 2D Flow Calculation Method, the 3D Flow Calculation method, or any of known methods using various melting models and/or calculation flows. Also, the analyzer unit 103 may be implemented by using a commercially available numerical analysis software (simulation software), such as a commercially available software product "TEX-FAN" supplied by The Japan Steel Works, Ltd., where "TEX-FAN" is a trademark of the supplier. The physical quantities, the values of which are calculated by the analyzer unit 103, include: the extruded resin temperature; the specific power (Esp.); the solid phase occupation ratio; the residence time; the maximum possible resin pressure in the kneading zone; the fill length in the kneading zone; the motor power; the maximum possible torque; and others.

The file generator unit 104 generates a new learning file 161 when new values of the parameters are provided, and stores the generated learning file 161 in the storage 16. The new parameters may be provided as the analysis results generated by the analyzer unit 103 or as the experiment results acquired through the acquisition unit 101. The learning file 161 is used by the learning unit 105 in order to carry out the learning procedure. The learning file 161 contains various data items, including: an item indicating a process type number for identifying a process type; items indicating various operation conditions, such as an extrusion amount (or feed amounts of raw materials); items indicating various configuration data, such as screw configurations and cylinder configurations; items indicating various physical quantities obtained as the analysis and experiment results, such as an extruded resin temperature. The data items may have associated values recorded in the learning file. The learning file 161 will be described later in more detail.

The learning unit 105 accesses the learning file 161 stored in the storage 16 so as to obtain the values of the data items, and carries out the learning procedure in order to learn the correlations among the process type, the operation conditions, the configuration data and the physical quantities. In particular, the learning procedure is carried out through a deep learning process, and the results of the deep learning process are recorded in a knowledge file 162 stored in the storage 16. The learning procedure is carried out each time when a new learning file 161 is generated, and the knowledge file 162 is updated at that timing. The learning procedure carried out by the learning unit 105, as well as the knowledge file 162, will be described later in more detail.

The search unit 106 accesses the knowledge file 162 stored in the storage 16 in order to search the knowledge file 162 for the optimum screw configuration(s) that is/are able to meet the specified conditions which are specified by the operator. The search unit 106 may also search the knowledge file 162 for other configuration data, such as the desirable cylinder configuration(s) and desirable values of the operation conditions.

The configuration generator unit 107 accesses an ID list 163 stored in the storage 16, and generate 2-dimensional data representing the optimum screw configuration(s) searched out by the search unit 106, on the basis of the geometry data contained in the ID list 163. The configuration generator unit 107 then controls the presentation unit 15 so as to present a visual image of the optimum screw configuration(s) to the operator.

[Learning File 161]

With reference now to FIG. 4, the learning file 161 mentioned above is described in detail. FIG. 4 is a schematic diagram showing a data structure of the learning file according to the embodiment. As shown in FIG. 4, the learning file 161 according to the embodiment contains (i) a group of items belonging to Basic Item Group 161a, which indicate the values of the extrusion process conditions, which are used also as the values of the analysis conditions and as the values of experiment conditions. The learning file 161 also contains (ii) a group of items belonging to Actual Measurement Item Group 161b, which indicate values of the experiment results actually measured through an experiment, (iii) a group of items belonging to Analysis Result Item Group 161c, which indicate values of the analysis results calculated out through a numerical analysis, and (iv) a group of items belonging to Error Amount Item Group 161d, each of which indicates an amount of difference between the value of one of the items in Actual Measurement Item Group 161b and the value of the corresponding one of the items in Analysis Result Item Group 161c.

The items in Basic Item Group 161a indicate the values of the extrusion process conditions, which include: the process type; the operation conditions of the extruder; and the configuration data of the extruder. More specifically, the process type is indicated by the value of the item "Process Type Number", the operation conditions are indicated by the values of the items "Extrusion Amount" and "Screw Rotation Speed", and the configuration data are indicated by the values of the items "Extruder Size Number", "Screw Configuration Numbers" (the value of this item is a set of numbers each being 1 to n), and "Cylinder Configuration Numbers" (the value of this item is a set of numbers each being 1 to n). The items in Actual Measurement Item Group 161b indicate actual measured values of specified physical quantities, which are actually measured through such experiment that is carried out under the experiment conditions that are the same as the extrusion process conditions indicated by the values of the items in Basic Item Group 161a. The actual measured values of the specified physical quantities include: the actual measured extruded resin temperature; the actual measured specific power; the actual measured solid phase occupation ratio; the actual measured residence time; the actual measured maximum pressure (resin pressure) in the kneading zone; and the actual measured maximum torque.

The items in Analysis Result Item Group 161c indicate analytically calculated values of specified physical quantities, which are calculated out as the analysis results of such numerical analyses that are carried out under the analysis conditions that are the same as the extrusion process conditions indicated by the items in Basic Item Group 161a. The analytically calculated values of the specified physical quantities include: the analytically calculated extruded resin temperature; the analytically calculated specific power; the analytically calculated solid phase occupation ratio; the analytically calculated residence time; the analytically calculated maximum pressure (resin pressure) in the kneading zone; and the analytically calculated maximum torque. The items in Error Amount Item Group 161d each indicates an error amount between the actual measured value and the analytically calculated value of a specified physical quantity which is common between Actual Measurement Item Group 161b and Analysis Result Item Group 161c, such as the extruded resin temperature, the specific power, and others. The items in Basic Item Group 161a, Actual Measurement Item Group 161b, Analysis Result Item Group 161c and Error Amount Item Group 161d have their own values associated in the learning file 161.

Actual extrusion processes carried out by using an extruder could be categorized into so many process types, depending on the base polymer to be used, whether any additive(s) such as fillers is/are used or not, the desired temperature in the cylinder which is selected in view of the base polymer and additive(s), the size of the extruder, the extrusion amount, the screw rotation speed, and/or other factors. In particular, both the cylinder configuration and the screw configuration are highly dependent on the base polymer and the additive(s) to be used, because the cylinder configuration has to be inferred in view of (i) the location at which the base polymer and additive(s) are introduced into the cylinder and (ii) the amounts of the base polymer and the additive(s) introduced at that location, and the screw configuration has to be inferred in view of the position of the zone in the cylinder within which kneading process is required. For these reasons, according to the embodiment, the learning file is so designed to have information about the raw materials of the resin, which is the information indicated by the item "Process Type". For example, the value "1" of the item "Process Type" is allocated to the extrusion process in which "the base polymer is polypropylene and the additive is particulate filler", and the value "2" of the item "Process Type" is allocated to the extrusion process in which "the base polymer is polypropylene and the additive is fibrous filler". These examples show a relatively coarse categorization of the process type. Note in this relation that a finer categorization may not be necessarily more desirable. In contrast to obtaining the data of numerical analysis results, collecting the data of experiment results is a costly and time-consuming process, so that an excessively fine categorization of the process type may necessitate collecting the data of a vast number of process patterns, which may amount to thousands or tens of thousands patterns. Consequently, for a finer categorization, data amount per a process type has to be reduced, leading to a lower precision of the knowledge file 162. Thus, by using a relatively coarse categorization, too few data amount per a process type may be avoided and consequently a high precision of the knowledge file 162 may be achieved.

The value of the item "Extruder Size Number" specifies the size of the extruder, in which the "size of the extruder" may be the total length of the cylinder or may be the total length of the screw. The set of numbers (each being 1 to n) of the item "Screw Configuration Numbers" specify the screw elements (such as kneading discs) to be connected together to construct the screw of the extruder, and also specify the positions of such screw elements. For example, if the set of numbers are "1, 2, 4, 6", it is specified that the four kneading discs to which these numbers are allocated are to be connected together to construct the screw. The item "Screw Configuration Numbers" may preferably include additional information specifying the transfer area for transferring plastic material and the melt-kneading zone for melt-kneading plastic material. The set of numbers (each being 1 to n) of the item "Cylinder Configuration Numbers" specify the cylinder elements to be connected together to construct the cylinder of the extruder, and also specify the positions of such cylinder elements. The cylinder elements so specified have an inner diameter which corresponds to the size of the extruder.

Basic Item Group 161a may include further items in addition to those described above, including: the bulk density of the base polymer; any used additive(s) which may be required for mixing/kneading two or more base polymers together or for mixing inorganic fillers with the base polymer(s); the feed amount(s) of the additive(s); the introducing locations of the additive(s); the density of solvent in the introduced base polymer during devolatilizing process; and others. Also, Actual Measurement Item Group 161b and Analysis Result Item Group 161c may include further items in addition to those described above, including: the fill length in the kneading zone; the motor power; the melting condition of the extruded resin (i.e., whether or not the extruded resin is entirely melted); and others. In particular, the melting condition of the extruded resin may be indicated by the value of the item "Melting Condition of Extruded resin", which may be set to "1" if the extruded resin is entirely melted, and "2" if it is not. With the embodiment described herein, the items in Analysis Result Item Group 161c and the items in Actual Measurement Item Group 161b have the one-to-one item correspondence. However, if a physical quantity is difficult to actually measure, while it can be analytically calculated, the physical quantity may be an item included in the items in Analysis Result Item Group 161c. For example, the value of the shear stress, which is indicative of the level of dispersive mixing, is such a physical quantity. Also, the value of the cumulative shear strain, which is indicative of the level of distributive mixing, is such a physical quantity. The items in Analysis Result Item Group 161c may preferably have items indicating these physical quantities, which allows the screw configuration inference apparatus to learn as to what level of dispersive mixing or distributive mixing may be achieved by a specified screw configuration.

With the learning file 161 of the embodiment shown herein, there is one-to-one item correspondence between the items in Analysis Result Item Group 161c and the items in Actual Measurement Item Group 161b. There may be, however, an experiment in which the value of an item is not measured, and thus that value is unobtainable. In such a case, a default value, which may be "9999" or "-" (hyphen), is recorded in the learning file 161 in place of that unobtainable actual measurement value. The default value indicates that the value should not be used for calculation of the error amount value. Also, there may be an analysis in which the value of an item is not calculated out, and thus that value is unobtainable. In such a case, a default value, which may be "9999" or "-" (hyphen), is recorded in the learning file 161 in place of that unobtainable analysis result value. With the embodiment described herein, the items in Actual Measurement Item Group 161b may be reduced by omitting any items other than the items "Actual Measured Extruded Resin Temperature" and "Actual Measured Specific Power", as the values of these two items can be measured as the experiment results, with relatively less difficulty.

[Deep Learning Process]

Figure 5:
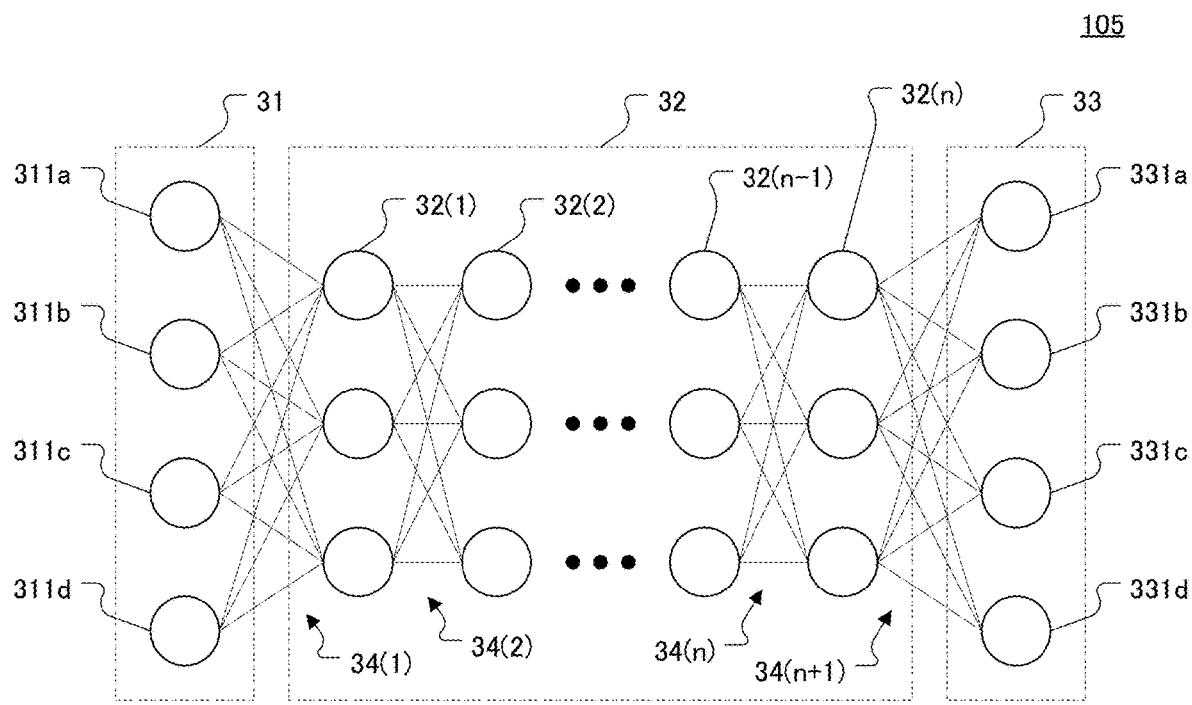
FIG. 5 is a schematic diagram illustrating a deep learning process carried out by the learning unit, which is one of the functional units of the screw configuration inference apparatus according to the embodiment.

With reference now to FIG. 5, a deep learning process carried out by the learning unit 105 is described in detail. FIG. 5 is a schematic diagram illustrating a deep learning process carried out by the learning unit, which is one of the functional units of the screw configuration inference apparatus according to the embodiment. As shown in FIG. 5, the learning unit 105 is a functional unit implemented as a multi-layered neural network 30 having an input layer 31, an intermediate layer (hidden layer) 32 and an output layer 33, with each layer including a plurality of nodes. In this neural network 30, (i) one or more of the nodes 311a-311d in the input layer 31 are connected with one or more of the nodes 32(1) in the intermediate layer 32, (ii) the nodes 32(1)-32(n) in the intermediate layer 32 are arranged in a multi-staged configuration and neighboring ones of them are connected with one another within the intermediate layer 32, and (iii) one or more of the nodes 32(n) in the intermediate layer 32 are connected with one or more of the nodes 331a-331d in the output layer 33. In this manner, the number of nodes are connected in a multi-staged configuration from the input layer 31 to the output layer 33.

The connection paths 34(1)-34(n+1), each connecting two of the nodes 311, 32(1)-32(n) and 331, have an associated weight coefficient. A calculation result derived at one node is transferred into another node, when the calculation result is weighed with the weight coefficient of the connection path connecting those two nodes. Further, each of the nodes has an associated activation function, and the calculation results transferred into a node are normalized with the activation function of that node.

The learning unit 105 (i) uses a set of values (known values) of the items in Basic Item Group 161a as an input pattern (or input data) to be inputted into the nodes 311 in the input layer 31, and (ii) uses a set of values (known values) of the items in Analysis Result Item Group 161d and Error Amount Item Group 161d as an output pattern (or teacher data) to be outputted from the nodes 331 in the output layer 33. Accordingly, the values of the extrusion process conditions are associated with the input nodes 311, and the values of the physical quantities, including the values of the analysis results and the values of the error amounts (or the differences between the values of the analysis and experiment results), are associated with the output nodes 331.

For example, with such association: the input node 311a may be selected as a specific input node for receiving the value of the item "Process Type Number"; the input node 311b may be selected as a specific input node for receiving the value of the item "Extruder Size Number"; the input node 311c may be selected as a specific input node for receiving the value set of the item "Screw Configuration Numbers"; and the input node 311d may be selected as a specific input node for receiving the value set of the item "Cylinder Configuration Numbers". Also, for example: the output node 331a may be selected as a specific output node for outputting the value of a physical quantity, the extruded resin temperature; the output node 331b may be selected as a specific output node for outputting the value of a physical quantity, the specific power; the output node 331c may be selected as a specific output node for outputting the value of a physical quantity, the error amount in the extruded resin temperature; and the output node 331d may be selected as a specific output node for outputting the value of a physical quantity, the error amount in the specific power.

In a case where the input nodes 311a-311d and the output nodes 331a-331d are selected as above, a learning process may be carried out with respect to a particular process type and a particular screw configuration, when with intervention of the intermediate layer 32 a set of output values are obtained on the output layer 33. If there are substantial differences between (i) the set of output values obtained through the learning process and (ii) the set of known values used as the teacher data and associated with the output layer 33, it means that the learning process has not yet achieved sufficient precision. Accordingly, on the basis of the knowledge of the learning results and the error amounts in the learning results, the weights associated with the connection paths 34(1) to 34(n+1) between the nodes are adjusted into new weights for use in the next iterated learning process. In this weight adjustment, the weights of the connection paths connected to any one of the output nodes, with which the value of one of the items in Error Amount Item Group 161d is associated, is adjusted such that the output value of that node become closer to a minimum (such as "0") by the adjustment. Iteration of the learning process leads to a reduction in the differences between (i) a set of output values obtained on the output layer 33 with the learning process and (ii) the set of values of the teacher data. When it is decided that the differences have become substantially null, then the iteration of the learning process is ended. At this point of time, it is deemed as the completion of the learning process for seeking the optimum value of a certain condition, such as the optimum screw configuration, that is dependent on the values of some other conditions.

The knowledge file 162 is prepared in order to contain the results of the learning process. Accordingly, the knowledge file 162 comprehensively contains the optimum values of various conditions, such as the optimum screw configuration, which are dependent on the values of some other conditions. In other words, the knowledge file 162 provides a know-how indicating correlations between (i) the values of the extrusion process conditions (including the process type, the values of the operation conditions of the extruder, and/or the configuration data of the extruder) and (ii) the values of various physical quantities, which are obtained as the analysis results or the experiment results. For example, the knowledge file 162 may contain the information showing the screw configurations which are able to meet various specified, desired values of the extruded resin temperature with various process types of the extrusion process. The learning unit 105 starts and carry out a fresh deep learning process each time when a new input pattern or a new output pattern is obtained, and the knowledge file 162 is updated at that timing, leading to an improvement in precision of the knowledge file 162.

The method of determining adjusted values of the weight coefficients by the learning unit 105 may be any of known methods suitable for the purpose, including, for example, the Back Propagation Method. Also, the activation function may be any of known functions suitable for the purpose. Since such methods and functions are well known in the art, they are not described herein in more detail.

[Flow of Procedures]

Figure 6:
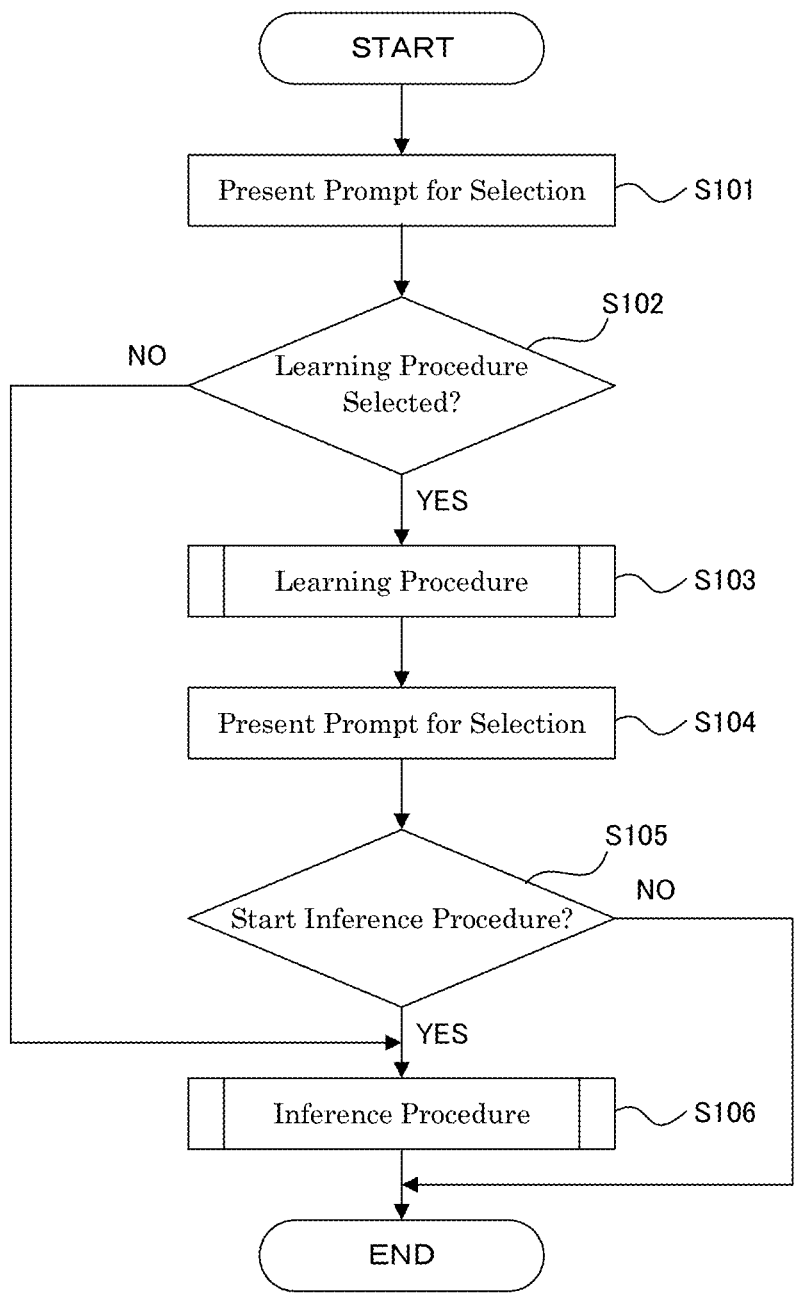
FIG. 6 is a flowchart showing a screw configuration inference procedure according to an embodiment.

With reference now to the accompanying drawings, the procedures carried out by the screw configuration inference apparatus 10 according to the embodiment are described in detail. FIG. 6 is a flowchart showing a screw configuration inference procedure according to an embodiment. Note that various values are calculated out through this procedure and stored in either the memory 12 or the storage 16, but the storing process of each value is omitted from the flowchart for simplicity.

As shown in FIG. 6, just after the screw configuration inference apparatus 10 is started, the decision making unit 102 controls the presentation unit 15 so as to present a visual prompt for selection, prompting the operator to select either to start the learning procedure for conducting learning or to start the inference procedure for inferring the optimum screw configuration (Step S101), and makes a decision as to whether it is selected by the operator to start the learning procedure (Step S102). If it is so selected (YES-branch from Step S102), then the learning procedure is started and carried out (Step S103). Following the completion of the learning procedure, the acquisition unit 101 controls the presentation unit 15 so as to present a visual prompt for selection, prompting the operator to select either to start the inference procedure or to not do it (Step S104), and then the decision making unit 102 makes a decision as to whether it is selected by the operator to start the inference procedure (Step S105). If it is so selected (YES-branch from Step S105), then the inference procedure is started and carried out (Step S106), and the flow ends.

If the decision in Step S102 is negative, meaning that it is not selected to start the learning procedure but it is selected to start the inference procedure (NO-branch from Step S102), then the inference procedure is started and carried out in Step S106. If the decision in Step S105 is negative, meaning that it is selected to not start the inference procedure (NO-branch from Step S105), then the flow ends.

Figure 7:
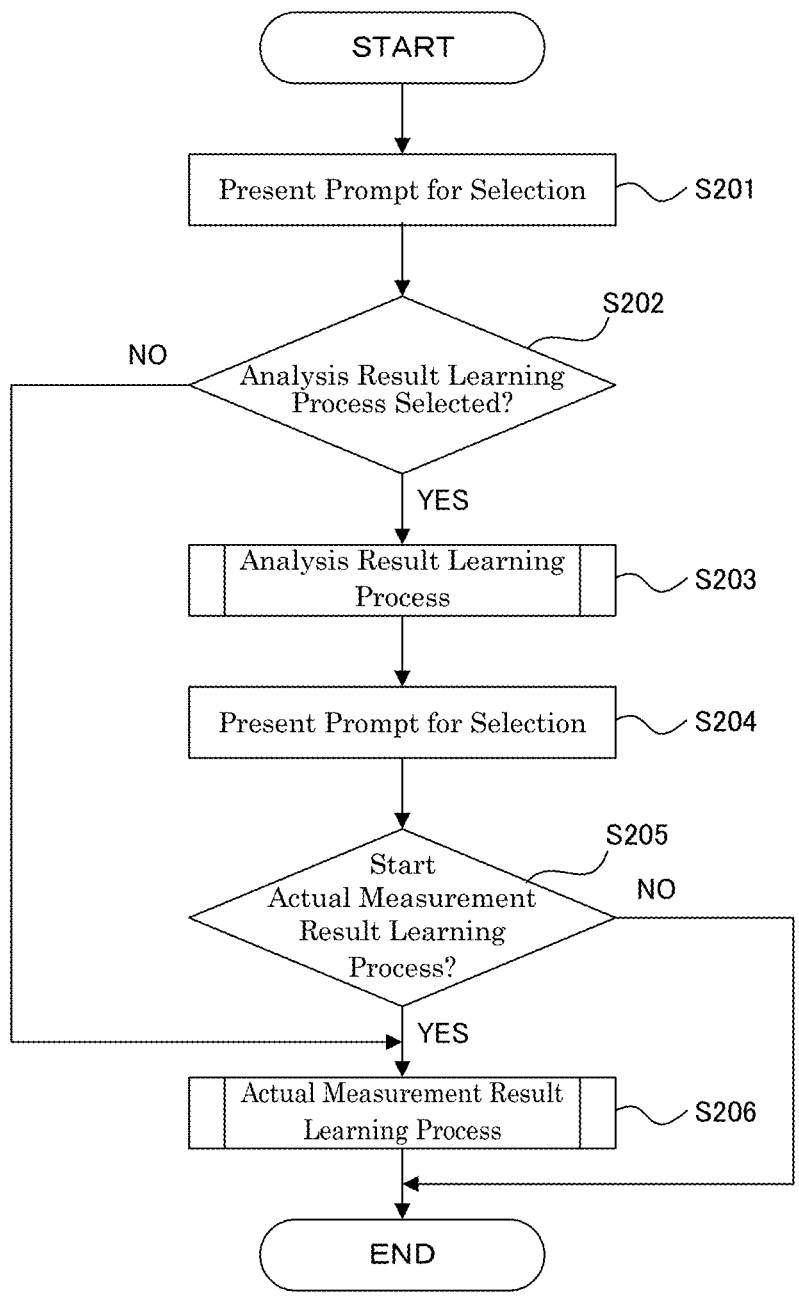
FIG. 7 is a flowchart showing the learning procedure in the screw configuration inference procedure.

With reference now to FIG. 7, the learning procedure mentioned above is described in detail. FIG. 7 is a flowchart showing the learning procedure.

As shown in FIG. 7, at first, the decision making unit 102 controls the presentation unit 15 so as to present a visual prompt for selection, prompting the operator to select either to start the analysis result learning process or to start the actual measurement result learning process for conducting learning on the basis of the experiment results (Step S201), and then the decision making unit 102 makes a decision as to whether it is selected by the operator to start the analysis result learning process (Step S202). If it is so selected (YES-branch from Step S202), then the analysis result learning process is carried out (Step S202), as will be described later in detail. Following the completion of the analysis result learning process, the acquisition unit 101 controls the presentation unit 15 so as to present a visual prompt for selection, prompting the operator to select either to start the actual measurement result learning process or to not do it (Step S204), and then the decision making unit 102 makes a decision as to whether it is selected by the operator to start it (Step S205). If it is so selected (YES-branch from Step S205), then the actual measurement result learning process is started and carried out (Step S206), and the flow ends.

If the decision in Step S202 is negative, meaning that it is selected by the operator to not start the analysis result learning process but to start the actual measurement result learning process (NO-branch from Step S202), then the flow goes to Step S206 to start and carry out the actual measurement result learning process. Also, if the decision in Step S205 is negative, meaning that it is selected to not start the actual measurement result learning process (NO-branch from Step S205), then the flow ends.

Figure 8:
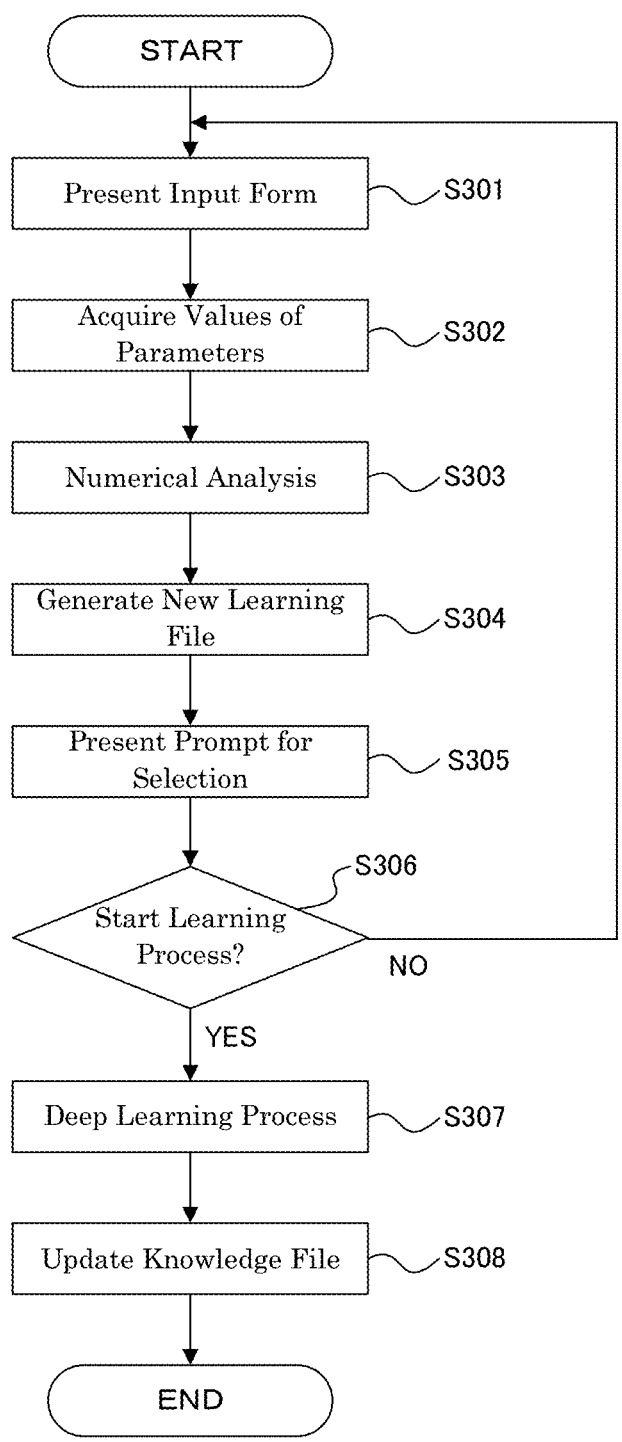
FIG. 8 is a flowchart showing the analysis result learning process in the learning procedure.

With reference now to FIG. 8, the analysis result learning process mentioned above is described in detail. FIG. 8 is a flowchart showing the analysis result learning process.

As shown in FIG. 8, at first, the acquisition unit 101 controls the presentation unit 15 so as to present a visual image of an input form to the operator (Step S301), and acquires the values of various parameters required for generating a new learning file 161 (Step S302). These parameters, the values of which are acquired in this step, are items of the analysis conditions (and thus, of the extrusion process conditions) for the numerical analysis, and include: (i) parameters relating to resin properties, (ii) parameters relating to operation conditions and (iii) parameters relating to configuration data. Though what parameters are required is dependent on (i) the method to be used for the numerical analysis and (ii) the physical quantities which have to be calculated out as the analysis results, the parameters are typically as follows. The parameters relating to resin properties may include: process type identifier number; model parameters for viscosity fitting; density in solid state; density in liquid state; specific heat; thermal conductivity; melting point; heat of fusion; and others. The parameters relating to operation conditions may include: extrusion amount; screw rotation speed; pressure acting on tip end of the screw; specified temperature in the cylinder; border positions of zone of specified temperature in the cylinder; position of the screw; mesh number (mesh size); number of calculation cycles; weighed amount of the resin; temperature of raw materials of the resin; back pressure; and others. The parameters relating to configuration data may include: screw configuration numbers; cylinder configuration numbers; inner diameter of the cylinder; outer diameter of the screw; depth of screw thread; lead of the screw; width of main flight; main flight clearance; starting point of sub flight; ending point of sub flight; sub flight clearance; and others. The process type number, the screw configuration numbers and the cylinder configuration numbers are inputted manually by the operator, when he/she may preferably reference to an ID index table, which shows the relation between these numbers and the associated specifications (such as, base polymer of the resin, geometries of the screw elements, geometries of the cylinder elements, etc.). The ID index table may be preferably prepared and stored in the storage 16.

Following the acquisition of the values of the parameters, the analyzer unit 103 carries out the numerical analysis on the basis of the acquired values of the parameters, and calculates out the values of various physical quantities as the analysis results (Step S303). Although the physical quantities, the values of which have to be calculated out here, are dependent on the method to be used for the numerical analysis, such physical quantities may, for example, include: the extruded resin temperature; the specific power; the solid phase occupation ratio; the maximum resin pressure in the kneading zone; the residence time; the fill length in the kneading zone; the motor power; the maximum torque; the plasticizing capacity; and others. The values of the physical quantities thus calculated out are recorded in a tentative file which is readable to the file generator unit 104. For example, the tentative file may have a format which have items corresponding to the items in Analysis Result Item Group 161c of the learning file 161, and the calculated values are associated with such items of the tentative file.

Following the completion of the numerical analysis, the file generator unit 104 generates a new learning file 161 on the basis of the acquired values of the analysis conditions and the values of the physical quantities calculated out as the analysis results (Step S304). More specifically, the file generator unit 104 obtains information about the values of the items in Basic Item Group 161a from the values of the analysis conditions, while obtains information about the values of the items in Analysis Result Item Group 161c from the values of the analysis results, and generates the new learning file 161 on the basis of such information. In addition, at this point of time, every one of the items in Actual Measurement Item Group 161b and Error Amount Item Group 161d has a default value, such as "9999", which indicates that the item is not to be used in the learning procedure.

In order to facilitate acquiring information about the values of the items in Basic Item Group 161a from the values of the analysis conditions, it is preferable to prepare a table showing the relation among (i) properties of the resin, (ii) base polymer and/or filler for the resin and (iii) the process type number in the storage 16. By using such table, the values of the parameters relating to the properties of the resin, which are required for the numerical analysis, can be automatically acquired when the operator selects the resin and/or filler in Step S301. Also, by using such table, the process type number corresponding to the specified base polymer and/or filler can be automatically acquired when a new learning file 161 is to be generated. Also, when the operator inputs the parameters of the properties of the resin in step S301, the item for selecting the process type may be provided in the input form so that the operator can determine the process type.

Following the generation of a new learning file 161, the decision making unit 102 controls the presentation unit 15 so as to present a visual prompt for selection, prompting the operator to select either to start the learning process or to not start it yet (Step S305), and then the decision making unit 102 makes a decision as to whether it is selected by the operator to start the learning process (Step S306). If it is selected to not start yet the learning process (NO-branch from Step S306), meaning that the operator considers there remain some other numerical analysis results which are to be used in the learning process, then the flow returns to Step S301 to again represent a visual image of an input form. Otherwise, if it is selected to start the learning process (YES-branch from S306), the learning unit 105 starts and carries out the deep learning process on the basis of the new learning file 161 thus generated (Step S307). Then, the knowledge file 162 is updated in consequence of the deep learning process (Step S308), and the flow ends.

Figure 9:
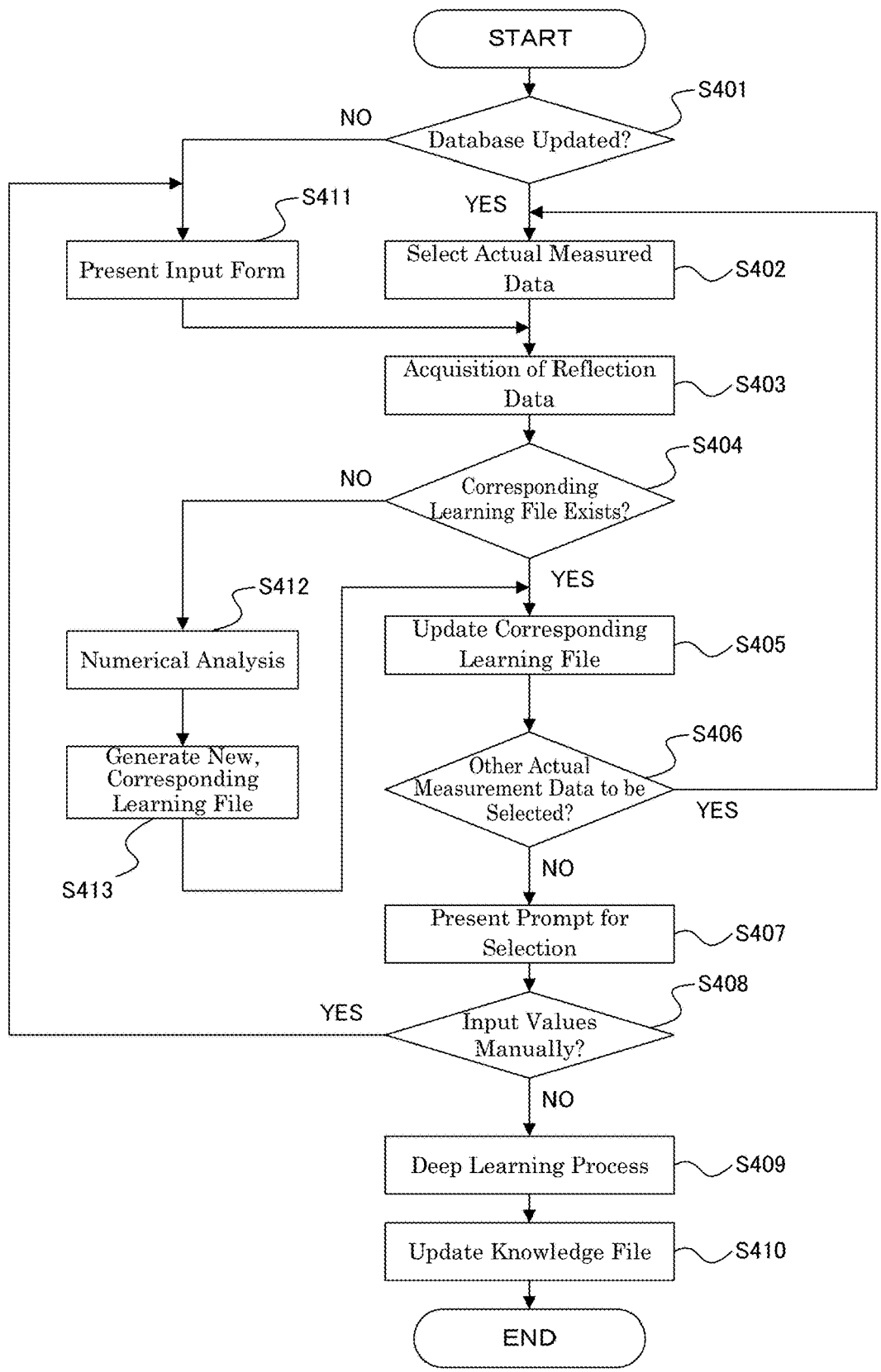
FIG. 9 is a flowchart showing the actual measurement result learning process in the learning procedure.

With reference now to FIG. 9, the actual measurement result learning process mentioned above is described in detail. FIG. 9 is a flowchart showing the actual measurement result learning process.

As shown in FIG. 9, at first, the decision making unit 102 accesses the database 20 and makes a decision as to whether the database 20 has been updated (Step S401). More specifically, for this decision, the decision making unit 102 makes a check as to whether the database contains any actual measurement data that have not been acquired yet. If the database 20 has been updated (YES-branch from Step S401), then the acquisition unit 101 selects those actual measurement data that have not been acquired yet (Step S402), and acquires "reflection information" from the selected data, which is the information to be reflected to the learning file (Step S403).

The actual measurement data 202 include (i) data relating to the experiment conditions (i.e., the extrusion process conditions) and (ii) data relating to the experiment results. The experiment conditions include: the process type; the operation conditions of the extruder; and the configuration data of the extruder. The experiment results are actual measured values of the quantities including: the extruded resin temperature (or the resin temperature at the front end of the extruder); the specific power (Esp.); and others. With this embodiment, the actual measurement data 202 are recorded in a tentative file which is readable to both the acquisition unit 101 and the file generator unit 104. For example, the tentative file may have a format which have items corresponding to the items in Basic Item Group 161a and the Actual Measurement Item Group 161b of the learning file 161, and the corresponding values are associated with such items of the tentative file. Accordingly, the reflection information mentioned above contains the values of those items of the actual measurement data 202 that correspond to the items in Basic Item Group 161a and in Actual Measurement Item Group 161b.

Following the acquisition of the reflection information, the decision making unit 102 makes a decision as to whether there exists such a learning file 161 that corresponds to the reflection information (Step S404). More specifically, the decision making unit 102 makes a decision as to whether the values of the items in Basic Item Group contained in the reflection information and the values of the items in Basic Item Group 161a contained in any one of the existing learning files 161 are the same. This means that the extrusion process conditions are the same between them. If such a learning file 161 that corresponds to the reflection information is found (YES-branch from Step S404), then the file generator unit 104 updates that learning file 161 by (i) replacing the values of the items in Actual Measurement Item Group 161b in that learning file 161 (such values may include the default value "9999", which indicates that the item is unusable in the learning process) with the values of the corresponding items in Actual Measurement Item Group 161b in the reflection information, (ii) calculating out the values of error amounts, each indicating an amount of difference between the new value of one of the items in Actual Measurement Item Group 161b and the value of the corresponding one of the items in Analysis Result Item Group 161c; and (iii) replacing the values of the items in Error Amount Item Group 161d in that learning file 161 (such values may include the default value "9999", which indicates that the item is unusable in the learning process) with thus calculated new values of error amounts (Step S405).

Following the update of that learning file 161, the decision making unit 102 accesses the database 20 and makes a decision as to whether there remain any other actual measurement data to be selected (Step S406). If there remain some other actual measurement data to be selected (YES-branch from Step S406), then the flow returns to Step S402 to select them. Otherwise, if there remain no such other actual measurement data (NO-branch from Step S406), then the decision making unit 102 controls the presentation unit 15 so as to present a visual prompt for selection, prompting the operator to select either to manually input values of some other actual measurement data or to not do it (Step S407), and makes a decision as to whether it is selected by the operator to input them (Step S408).

Otherwise, if it is selected to not input any such value manually (NO-branch from Step S408), then the learning unit 105 starts and carries out the deep learning process on the basis of that updated learning file 161 (Step S409). Then, the knowledge file 162 is updated in consequence of the deep learning process (Step S410), and the flow ends.

If the decision in Step S401 is negative, meaning that the database 20 has not been updated (NO-branch from Step S401), then the acquisition unit 101 controls the presentation unit 15 so as to present a visual image of an input form to the operator (Step S411), and acquires reflection information (Step S402). The input form presented in Step S402 may have the same format as the input form presented in Step S301, so that the operator may manually input the reflection information, such as the process type number, the screw configuration numbers, with reference to the ID index table described above.

If the decision in Step S404 is negative, meaning that there is no learning file 161 that corresponds to the reflection information (NO-branch from Step S404), then the analyzer unit 103 starts and carries out the numerical analysis on the basis of the values of the items in Basic Item Group contained in the reflection information (Step S412). Following the completion of the numerical analysis, the file generator unit 104 generates a new learning file 161 on the basis of the results of the numerical analysis, in which: (i) the values of the items in Basic Item Group 161a in the new learning file 161 are the same as the respective values of the numerical analysis conditions; (ii) the values of the items in Analysis Result Item Group 161c in the new learning file 161 are the same as the respective values of the calculated analysis results; and (iii) every one of the items in Actual Measurement Item Group 161b and Error Amount Item Group 161d has a default value, such as "9999", which indicates that the item is not to be used in the learning procedure (Step S413), and the flow proceeds to Step S405 to update the new learning file 161 thus generated. If the decision in Step S408 is positive, meaning that the operator has some other actual measurement data (i.e., experiment results) to be used in the learning process (YES-branch from Step S408), then the flow proceeds to Step S411 to present a visual image of an input form to the operator.

Figure 10:
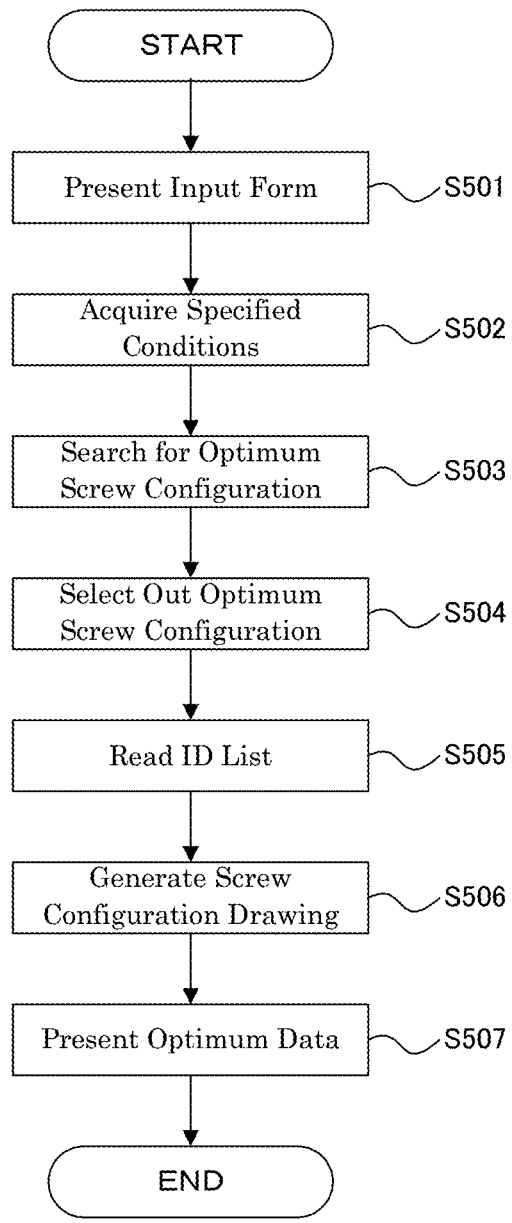
FIG. 10 is a flowchart showing the inference procedure in the screw configuration inference procedure.

With reference now to FIG. 10, the inference procedure mentioned above is described in detail. FIG. 10 is a flowchart showing the inference procedure.

As shown in FIG. 10, at first, the acquisition unit 101 controls the presentation unit 15 so as to present a visual image of an input form and prompt the operator to input any specified conditions which he/she may wish to specify (Step S501), and then acquires the data of the specified conditions (Step S502). The specified conditions should include at least (i) specified one(s) of the extrusion process conditions which are to be indicated by the items in Basic Item Group 161a in the learning file 161 (including the process type) and (ii) specified one(s) of the physical quantities which correspond to the items in Actual Measurement Item Group 161b and thus to the items in Analysis Result Item Group 161c (including the extruded resin temperature). When the operator specifies one(s) of the physical quantities, he/she also specifies the desired value of the specified physical quantity(ies). Although the operator has the option as to which one(s) of the extrusion process conditions is/are to be specified, it is preferable that at least the process type is specified. This is because both the analysis results and the experiment results are highly dependent on the extrusion process type, so that the results of the inference procedure are likely to be so vast if the process type is not specified.

In order to cause the optimum screw configuration to be inferred, the operator leaves the blank in the input form that is prepared for a set of numbers of the item "Screw Configuration Numbers" unfilled (i.e., no set of numbers is inputted in the blank). Also, if the operator wishes to cause the optimum value(s) of certain one(s) of the extrusion process conditions (such as the optimum value of the screw rotational speed) to be inferred together with the optimum screw configuration, then he/she leaves the blank in the input form prepared for a value of the item "Screw Rotation Speed" unfilled. At the time when the optimum screw configuration(s) has/have been inferred, the optimum values of the not specified extrusion process conditions and not specified physical quantities have been also inferred, so that their expected values (hereinafter referred to as "expected information") are automatically outputted from the screw configuration inference apparatus.

For an example, if the operator wishes to find out the optimum screw configuration for use in an extrusion molding process of polyethylene at the desired extruded resin temperature of 200° C., he/she would input into the prepared blanks of the presented input form by: filling the blank for a value of the item "Process Type" with "polyethylene"; leaving the blank for a set of numbers of the item "Screw Configuration Numbers" unfilled; filling the blank for a value of the item "Specified Physical Quantity(ies)" with "extruded resin temperature"; and filling the blank for a desired value of the specified physical quantity(ies) (here, the specified physical quantity is the extruded resin temperature) with "200° C.". The input form presented for the purpose may be generated on the basis of the items in the learning file 161. By this, when a new item is added to a learning file 161, that new item is automatically used in the learning procedure for that learning file 161.

Following the acquisition of the specified condition, the search unit 106 accesses and searches the knowledge file 162 for such screw configuration(s) that is/are able to meet the specified values of the specified physical quantities under the specified extrusion process conditions (Step S503), and selects out them as the optimum screw configuration(s) (Step S504). The screw configuration(s) selected out as the optimum ones is/are able to exactly meet the specified values of the extrusion process conditions, while to only approximately meet the specified values of the specified physical quantities, meaning that some error amounts are allowed. This is because the set of the specified values of the specified physical quantities have been used as an output pattern for the learning process, and adjusted through the learning process. Thus, the expression "to meet the specified values" means "to make the values of the specified physical quantities fall in respective ranges around the specified values, allowing some errors". The error amounts are dependent on the precision of the learning procedure. In cases where two or more screw configurations which are able to meet the specified values have been found in the search, then all of them may be selected out as the optimum screw configurations, or some of them which are able to meet the specified values with smallest error amounts may be selected out.

Following the completion of the process of selecting out the optimum screw configuration(s), the configuration generator unit 107 accesses the ID list 163 stored in the storage 16. The ID list 163 indicates correlations between (i) each of the numbers which may be used as the screw configuration numbers and (ii) the corresponding screw element geometry data. With reference to the ID list 163, the configuration generator unit 107 retrieves the screw element geometry data that correspond to screw configuration numbers that indicate the screw configuration(s) thus selected out (Step S505). The screw element geometry data may be 2-dimensional data, or may be 3-dimensional data. After retrieving the screw element geometry data, the configuration generator unit 107 generates the screw configuration(s), or in other words, draws a drawing (or drawings) of the screw configuration(s), on the basis of the screw element geometry data thus retrieved (Step S506). Then, the optimum data including: (i) the drawing(s) of the optimum screw configuration(s); (ii) the optimum values of those of the extrusion process conditions the values of which have not been specified; (iii) the expected information under the extrusion process conditions, such as the expected extruded resin temperature and the expected load acting on the extruder; and others, are presented to the operator (Step S507), and the flow ends.

Figure 11:
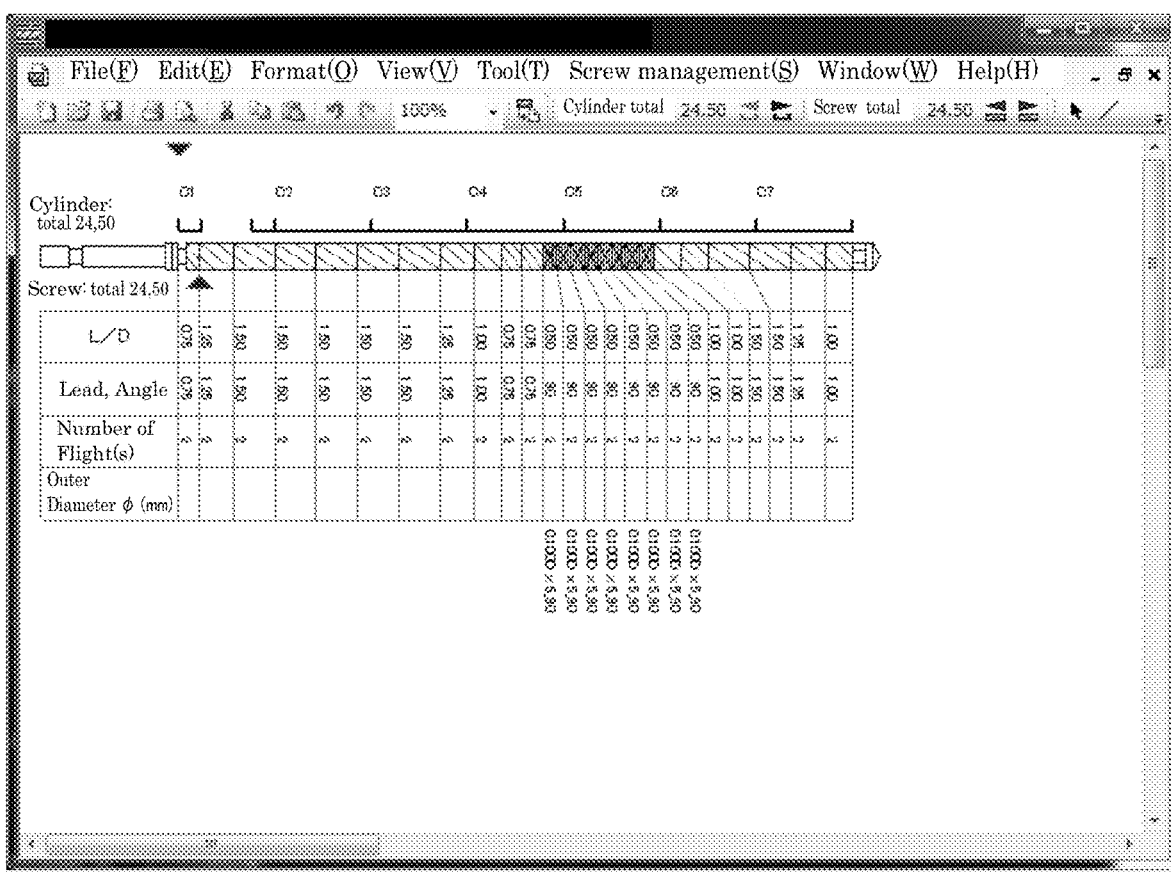
FIG. 11 is a diagram showing an example of configuration data presented to the operator, the configuration data being a part of the optimum data and including a drawing of the optimum screw configuration.

FIG. 11 is a diagram showing an example of configuration data presented to the operator, the configuration data being a part of the optimum data and including a drawing of the optimum screw configuration. As shown in FIG. 11, the optimum screw configuration is presented as a visual image to the operator. In FIG. 11, four items "L/D", "Lead, Angle", "Number of Flight(s)" and "Outer Diameter φ (mm)" are presented together with the values of these items. The values of these items are connected to each number which may be used in the set of numbers of the item "Screw Configuration Numbers" indicated in the ID list 163, and therefore, such values are acquired at the time when the ID list 163 is accessed.

Example

Figures 12, 13:
FIG. 12 is a schematic diagram showing the position of a kneading part of the screw according to with example.
FIG. 13 is a table showing three different screw elements, which were used to construct the kneading part of the screw.

With reference now to FIGS., an example of the use of the screw configuration inference apparatus 10 according to the embodiment is described. FIG. 12 is a schematic diagram showing the position of a kneading part of the screw with this example. FIG. 13 is a table showing three different screw elements, which were used to construct the kneading part of the screw. FIG. 14 is a table showing screw configurations (kneading part screw configurations), which were used for the numerical analysis. With this example, the optimum screw configuration inference was performed for a screw to be implemented in a twin screw extruder and used for performing a polypropylene extrusion process. In order to infer the optimum screw configuration that is able to meet the desired, specified values of the specified physical quantities, the screw configuration inference apparatus 10 conducted the learning procedure on the basis of the analysis and experiment results.

For evaluation of the screw configurations inference and, in particular, for collecting the required data for the learning procedure, a commercially available twin screw extruder "TEX25αIII" was used. The extruder has a cylinder with an inner diameter φ=26.5 mm (this inner diameter is indicated by "D" hereinafter) and the total screw length to diameter ratio (L/D) of 52.5. Each screw of the extruder was so configured as to have a kneading part 40 (see FIG. 12) with a length to diameter ratio (LID) of 4. The kneading part of the screw defines the kneading zone of the extruder, within which resin should be melted and plasticized. The rest of the screw was constructed with screw elements of the full-flight type for conveying resin within the cylinder. An assumption was established that the kneading part 40 of the screw, having a length to diameter ratio (LID) of 4, should be constructed with a combination of plurality of screw elements, to be selected from a group of predetermined, different kinds of screw elements. Each screw element should be of one of three types including "forward twisted kneading disc" type, "backward twisted kneading disc" type and "orthogonal (or non-twisted) kneading disc" type, and should have one of three length to diameter ratios including "0.5", "1.0" and "1.5". This means that a total of nine different kinds of kneading discs may be used for the screw configuration(s). In order to construct the kneading part of the screw, having a length to diameter ratio (L/D) of 4, there may be 46,090 different, possible combinations of such screw elements, and thus the kneading part of the screw may be configured in 46,090 different screw configurations. With the example described herein, the numerical analysis was carried out for every one of the 46,090 different screw configurations, while extrusion process experiments were carried out for only four different screw configurations A to D shown in FIG. 14.

In the extrusion process experiments, the process type was specified such that the extruded resin should be polypropylene having a melt flow rate (MFR), a measure for the ease of flow of melted plastics, of 9.0. Also, the operation conditions were specified such that, for each of the screw configuration A to D, the extrusion process should be repeated with different extrusion amounts and different screw rotational speeds, in which an extrusion amount of 10 kg/hour in combination with one of three screw rotation speeds of 100 rpm, 200 rpm and 300 rpm, and an extrusion amount of 30 kg/hour in combination with one of three screw rotation speeds of 200 rpm, 300 rpm and 400 rpm should be used. The temperature in the cylinder was specified to be the same among all of the experiments. Accordingly, only the extrusion amount and the screw rotational speed were varied in the extrusion process experiments. All of the extrusion process conditions mentioned above were also used for the numerical analysis carried out for each of the screw configurations, for which a commercially available simulation software product "TEX-FAN" was used.

FIG. 15 is two tables, each showing both the experiment results and the analysis results, in which table (a) shows the results with the extrusion amount of 10 kg/hour, while table (b) shows the results with the extrusion amount of 30 kg/hour. As seen from the tables of FIG. 15, in all of the experiments with the extrusion amount of 10 kg/hour, no non-melted raw materials were found existing in the extruded resin, irrespective of any other experiment conditions. On the other hand, in many of the experiments with the extrusion amount of 30 kg/hour, non-melted raw materials were found existing in the extruded resin. This means that none of the screw configurations A to D are able to provide a sufficient amount of kneading energy for melting and plasticizing the resin. Also, this suggests that uniform mixing/kneading could not be achieved even with the extruded resin temperature higher than 200° C. Although there were some differences in the extruded resin temperature between the analysis results and the experiment results, it was found that the expectation of the non-melted raw materials, which was shown by the analysis results, predicted so well the existence of non-melted raw materials in the extruded resin. For the extrusion processes with relatively higher screw rotation speeds, the expected extruded resin temperatures in the analysis results were higher than the actually measured temperatures by about 15° C., but there were an apparent correspondence between the expected and measured temperatures as a whole.

The numerical analysis was carried out for every one of the 46,090 possible screw configurations, for constructing the kneading part having a length to diameter ratio (L/D) of 4, by using the above mentioned software product "TEX- FAN". The analysis conditions used for the purpose were the same as the extrusion process conditions described above. The analysis results obtained through all of the numerical analyses amounted to a little fewer than 280,000 sets. All of the analysis and experimental results (including the indication as to whether non-melted raw materials exist in the extruded resin) were inputted into the screw configuration inference apparatus 10 and the learning procedure of Step S103 was carried out, through which a number of learning files 161 were generated. Some of the generated learning files 161 had the format shown in FIG. 4 and thus contained both the analysis and experiment results, while the other of the generated leaning files 161 contained the analysis results but no experiment results. Then those learning files 161 were used to carry out the deep learning process, through which a knowledge file 162 was obtained. Then, the knowledge file 162 was used to carry out the inference procedure of Step S106. The specified conditions for the inference procedure were specified such that: (i) the process type is "polypropylene type"; (ii) the extruder size number corresponds to the above mentioned "TEX25αIII" extruder; (iii) the extrusion amount is 30 kg/hour; (iv) the screw rotation speed is left unspecified (i.e., the corresponding blank in the input form is left unfilled); (v) the specified physical quantity is the extruded resin temperature; (vi) the specified value of the extruded resin temperature is 200° C.; and (vii) no non-melted raw materials exist in the extruded resin (i.e., the extruded resin is entirely melted).

FIG. 16 is a table showing optimum screw configurations which are able to meet the specified conditions, and which have been inferred through the inference procedure. As the results of the inference procedure of Step S106, four different screw configurations E to H shown in FIG. 16 have been inferred. Also, the respective desired screw rotation speeds for the screw configurations E to H to meet the specified conditions have been inferred. The inferred, desired screw rotation speeds have the same value of 300 rpm. In comparison with the screw configurations A to D, the screw configurations E to H include (i) fewer forward twisted kneading disc type elements, which have relatively high conveying capacity, while (ii) more backward twisted kneading disc type elements, which produce relatively high resin pressure in the kneading zone, and (iii) more orthogonal kneading disc type elements, which have highest kneading capacity. This suggests that the screw configuration inference apparatus 10 has learned from the data showing the fact that some of the screw configurations A to D are not able to provide a sufficient amount of kneading energy with the extrusion amount of 30 kg/hour, as indicated in table (b) of FIG. 15, and, as the consequence of the learning, the screw configurations E to H having higher kneading capacities than the screw configurations A to D have been inferred and outputted as the recommendable, optimum screw configurations.

FIG. 17 is a table showing the experiment and analysis results for the optimum screw configurations. Although the screw rotation speed to meet the specified conditions had been found to be 300 rpm, evaluation was made with the screw rotation speeds from 250 rpm to 400 rpm with an increment of 50 rpm, for verification purpose. As shown in the columns labelled "analysis" of the table of FIG. 17, the expected extruded resin temperatures are higher than 200° C. for any of the screw configurations with any of the screw rotation speeds. This suggests that the screw configuration inference apparatus 10 has learned from the data proving the fact that the analytically calculated extruded resin temperatures showed a tendency to be higher than the actual measured extruded resin temperatures in the experiments conducted for the screw configurations A to D, as shown in table (b) of FIG. 15. Also, it was expected that no non-melted raw materials would exist in the extruded resin for the screw configurations E to H, under any extrusion process conditions.

As seen from the columns rebelled "actual measurement" of the table of FIG. 17, which columns show the results of the verification experiments carried out by using the actual twin screw extruder, no non-melted raw materials were found existing in the extruded resin with the screw rotation speed of 300 rpm, and the extruded resin temperature fell within the range of 200° C.±1° C., meaning that the error amounts were so small. Accordingly it has been verified that the optimum screw configurations have been inferred with good precision by virtue of the machine learning, implemented as the deep learning process, which was conducted by the screw configuration inference apparatus 10. Consequently, it has been found that the screw configuration inference apparatus 10 according to the embodiment, which is constructed to carry out the learning procedure so as to optimize the specified conditions including the screw configuration, is so useful for the inference of the screw configuration of extruders, and provides outputs of the specified conditions with good precision.

As described above, with the screw configuration inference apparatus 10 according to the embodiment, by virtue of the use of the knowledge file 162, the optimum screw configurations that meet the specified conditions are advantageously inferred and presented to the operator. Thus, even poorly experienced operators, who may often have no knowledge nor know-how about screw configurations, can recognize, without any difficulties, the optimal screw configurations that meet the specified conditions.

Also, by virtue of the use of the learning file 161 in the learning procedure, which contains the data relating to (i) the operation conditions such as the extrusion amount and (ii) various physical quantities, the values of which are obtained as the analysis and experiment results, the optimum extrusion process conditions for the optimum screw configurations as well as the expected information corresponding to the optimum screw configurations may be inferred together with the optimum screw configurations. Accordingly the operator can recognize the ideal configuration of the extruder as well as the ideal extrusion process conditions for the extruder.

With the embodiment described above, the drawing(s) of the optimum screw configuration(s) is/are drawn by the configuration generator unit 107 for the purpose of presenting the optimum data to the operator, so that the operator may have a visual image of the optimum screw configuration(s), leading to an improvement in applicability of the invention to the actual extruders.

With the embodiment described above, if there exists no learning file 161 containing the values of the analysis results which are obtained under the same extrusion process conditions as those under which new experiment results are obtained, then the numerical analysis is carried out in order to generate a new learning file. Thus, there may exist two different kinds of learning files 161, one version of learning files containing only the values of the analysis results and no values of the items in Actual Measurement Item Group and Error Amount Item Group, while the other version of learning files containing the values of both the analysis and experiment results, as described above. However, the embodiment may be modified such that if there exists no learning file 161 containing the values of the analysis results which are obtained under the same extrusion process conditions as those under which new experiment results are obtained, then, instead of carrying out the numerical analysis, the deep learning process is carried out by using only a third version of learning file 161 containing only the values of the experiment results and no values of the items in Analysis Result Item Group 161*c* and Error Amount Item Group 161*d*. Also, the learning procedure of Step S103 may be modified such that the actual measurement result learning process of Step S162 is omitted, and the deep learning process is carried out on the basis of a fourth version of learning file 161 containing only the values of the numerical analysis results so as to generate the knowledge file 162.

With the embodiment described above, the screw configuration inference apparatus 10 selects out the optimum screw configuration(s) and presents it/them to the operator by means of the presentation unit 15. The selection and presentation processes, however, do not necessarily have to be carried out in this way. For example, the value ranges, within which the specified values of the specified physical quantities should fall, may be widened, and more screw configurations may be selected out as the optimum screw configurations and presented to the operator. Also, the optimum screw configurations found in the search may presented as items in a list. In such a list, the optimum screw configurations found in the search may be sorted in the list depending on how well the specified value(s) are met by the screw configurations, and only one(s) of the screw configurations that are selected by the operator may be presented with the drawing(s) which is/are generated through the screw configuration generation procedure of Step S506.

With the embodiment described above, the configuration generator unit 107 draws only drawings of screw configurations. In a possible modified embodiment, the ID list 163 indicates correlations between (i) each of the numbers which may be used as the cylinder configuration numbers and (ii) the corresponding cylinder element geometry data, and the cylinder configuration may be presented as a visual image, i.e., with a drawing, to the operator.

With the embodiment described above, the reflection information are acquired from the actual measurement data 202 and/or the input form, and then the acquired reflection information is reflected to a learning file 161 that contains the values of the items in Basic Item Group 161*a* that are the same as the values of the items in Basic Item Group 161*a* contained in the reflection information. This process, however, may be replaced with a four step process, including: (i) generating a new learning file 161 that contains only the values of the items in Basic Item Group 161*a* and Actual Measurement Item Group 161*b* on the basis of the actual measurement data 202 and/or the input form; (ii) storing that new learning file 161 in the storage; (iii) making a search for an existing learning file 161 that has the values of the items in Basic Item Group 161*a* the same as those of the generated new learning file 161 and also has the values of the items in Analysis Result Item Group 161*c*; and (iv) consolidating the generated new file and the searched out existing learning files so as to unite the information contained in these files.

With the embodiment described above, the inference procedure ends with the process of presenting the optimum data to the operator. This process may be modified by adding thereto a numerical analysis process carried out by the analyzer unit 103 on the basis of the optimum data. By this, the optimum data may be automatically verified and the results of that analysis process, including expected values of the properties of the extruded resin may be outputted together with the optimum data.

The present invention may be embodied in various other forms without departing from the spirit or essential characteristics thereof. The embodiment described above is therefore to be considered in all respects as illustrative and not restrictive. The scope of the invention is indicated by the appended claims rather than by the foregoing description. Further, any and all alterations, improvements, substitutions and modifications which come within the meaning and range of equivalency of the claims are therefore encompassed within the scope of the invention.

Figure 18:
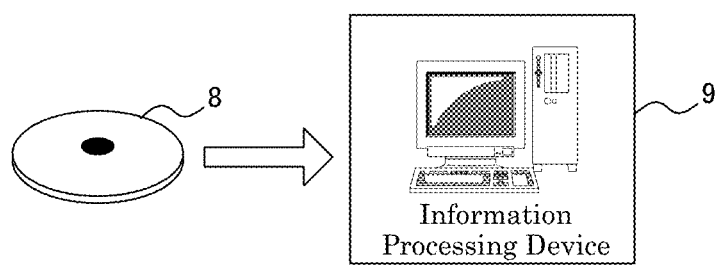
FIG. 18 is a schematic diagram showing a situation where a computer program product for a screw configuration inference is used with an information processing device.

The present invention also provides a computer program product for screw configuration inference, including a screw configuration inference program stored in a computer-readable storage medium, which may be a mobile medium 8 as shown in FIG. 18. The program, when loaded on and executed by a computer (or an information processing device 9 as shown in FIG. 18), causes the computer to implement the procedures and processes of the screw configuration inference apparatus 10, which are described above in connection to an embodiment of the invention, so as to provide the above described functions. The storage medium 8 may be any kind of computer-readable medium, including: optical discs (such as CD-ROM, DVD, etc.); magnetic discs (such as hard disk drive, etc.); Flash Memory; IC-card; and other media, some of which may utilize a network.

LIST OF REFERENCE NUMERALS

10 Screw configuration inference apparatus
16 Storage (Storage unit)
161 Learning file (Learning information)
162 Knowledge file (Knowledge information)
101 Acquisition unit (Information acquisition unit)
102 Decision making unit (Information Decision making unit)
103 Analyzer unit (Numerical analyzer unit)
104 File generator unit
105 Learning unit (Correlation learning unit)
106 Search unit
107 Configuration generator unit (Configuration inference unit)

What is claimed is:

1. A screw configuration inference apparatus, comprising: a central processing unit (CPU) configured to execute executable units stored on a memory, the executable units comprising:
    an information acquisition unit that acquires input information including resin properties and acquires, as output information, a specified value of a physical quantity related to a kneaded resin or a kneading machine;
    a storage unit that stores knowledge information including correlations among the input information, the physical quantity, and a plurality of screw configurations; and
    a configuration inference unit that infers, based on the input information and the knowledge information, such a screw configuration that is able to meet the specified value; and
    a configuration generator unit that retrieves, from the storage unit, screw element geometry data corresponding to the screw configuration and renders a drawing of the screw configuration based on the screw element geometry data,
    wherein the knowledge information reflects correlations among process types, operating conditions, configuration data, and analysis results learned based on learning information including analysis results to be obtained by a numerical analysis carried out based on analysis conditions made of configuration data that include process types including resin properties, operation conditions including extrusion amounts, and configuration data including screw shape.

2. The screw configuration inference apparatus according to claim 1, further comprising
an information generator unit that generates the learning information including the analysis results; and
a correlation learning unit that carries out a learning procedure to learn the correlations based on the learning information, and reflects the learned correlations to the knowledge information.

3. The screw configuration inference apparatus according to claim 2, wherein:
the learning procedure carried out by the correlation learning unit includes a deep learning process that uses input data including a process type and a plurality of screw configurations, and uses teacher data including the physical quantity.

4. The screw configuration inference apparatus according to claim 1, wherein:
the information acquisition unit acquires experiment results that are obtained through an experiment carried out under experiment conditions including a specified process type, specified operation conditions, and specified configuration data, and include the physical quantity; and
the information generator unit is adapted for reflecting the experiment results to the learning information.

5. The screw configuration inference apparatus according to claim 4, further comprising:
an information decision unit that makes a decision as to whether the learning information includes analysis results obtained under analysis conditions that match experiment conditions of the experiment results;
wherein, in response to a determination by the information decision unit that the learning information includes analysis results obtained under analysis conditions that match the experiment conditions of the experiment results, the information generator unit generates error amount information indicating a difference between a value of a physical quantity in the experiment results and a value of a physical quantity in the analysis results, and reflects the error amount information to the learning information.

6. The screw configuration inference apparatus according to claim 5, further comprising:
a numerical analyzer unit that carries out a numerical analysis under the analysis conditions,
wherein, in response to a determination by the information decision unit that the learning information does not include analysis results obtained under the analysis conditions that match the experiment conditions of the experiment results;
the information generator unit reflects the analysis results obtained through the numerical analysis carried out by the numerical analyzer unit to the learning information, and generates error amount information indicating a difference between a value of a physical quantity in the experiment results and a value of a physical quantity in the analysis results obtained through the numerical analysis carried out by the numerical analyzer unit, and reflects the error amount information to the learning information.

7. A screw configuration inference method to be carried out by a screw configuration inference apparatus, comprising the steps of:
acquiring input information including resin properties;
acquiring, as output information, a specified value of a physical quantity related to a kneaded resin or a kneading machine;
storing, in a storage unit, knowledge information including correlations among the input information, the physical quantity, and a plurality of screw configurations, wherein the knowledge information reflects correlations among process types, operating conditions, configuration data, and analysis results learned based on learning information including analysis results to be obtained by a numerical analysis carried out based on analysis conditions made of configuration data that include process types including resin properties, operation conditions including extrusion amounts, and configuration data including screw shape;
inferring, based on the input information and the knowledge information, a screw configuration that is able to meet the specified value; and
render a drawing of the screw configuration based on the screw element geometry data corresponding to the screw configuration retrieved from the storage unit.

8. A computer program product for screw configuration inference, comprising computer instructions to cause the computer to function as:
an information acquisition unit that acquires input information including resin properties and acquires, as output information, a specified value of a physical quantity related to a kneaded resin or a kneading machine;
a storage unit that stores knowledge information including correlations among the input information, the physical quantity, and a plurality of screw configurations, wherein the knowledge information reflects correlations among process types, operating conditions, configuration data, and analysis results learned based on learning information including analysis results to be obtained by a numerical analysis carried out based on analysis conditions made of configuration data that include process types including resin properties, operation conditions including extrusion amounts, and configuration data including screw shape;
a configuration inference unit that infers, based on the input information and the knowledge information, a screw configuration that is able to meet the specified value; and
a configuration generator unit that retrieves, from the storage unit, screw element geometry data corresponding to the screw configuration and renders a drawing of the screw configuration based on the screw element geometry data.

* * * * *